US006990315B2

(12) United States Patent
Izumi

(10) Patent No.: US 6,990,315 B2
(45) Date of Patent: Jan. 24, 2006

(54) COMMUNICATION APPARATUS AND SYSTEM, AND CONTROL METHOD

(75) Inventor: Michihiro Izumi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 10/093,469

(22) Filed: Mar. 11, 2002

(65) Prior Publication Data

US 2002/0132584 A1   Sep. 19, 2002

(30) Foreign Application Priority Data

Mar. 13, 2001   (JP) ............................. 2001-070454

(51) Int. Cl.
H04B 5/00   (2006.01)

(52) U.S. Cl. ................ 455/41.1; 455/41.2; 455/435.1; 455/435.2; 455/456.2; 705/72; 705/64

(58) Field of Classification Search ............ 455/435.1, 455/41.2, 435.2, 456.2; 705/72, 64
See application file for complete search history.

(56) References Cited

U.S. PATENT DOCUMENTS

| | | | | |
|---|---|---|---|---|
| 5,119,414 A | 6/1992 | Izumi | ........................ | 379/157 |
| 5,245,653 A | 9/1993 | Izumi | ........................ | 379/157 |
| 5,267,307 A | 11/1993 | Izumi et al. | ................ | 379/354 |
| 5,291,549 A | 3/1994 | Izumi | ........................ | 379/233 |
| 5,331,667 A | 7/1994 | Izumi | ........................ | 375/107 |
| 5,467,395 A | 11/1995 | Izumi | ........................ | 379/399 |
| 5,519,706 A * | 5/1996 | Bantz et al. | ............ | 455/435.2 |
| 5,802,477 A | 9/1998 | Mizokami et al. | .......... | 455/525 |
| 6,032,049 A | 2/2000 | Izumi | ........................ | 455/509 |
| 6,130,885 A | 10/2000 | Izumi et al. | ................ | 370/343 |
| 6,256,504 B1 * | 7/2001 | Tell et al. | ................ | 455/456.2 |
| 6,275,517 B1 | 8/2001 | Izumi | ........................ | 375/133 |
| 6,782,241 B2 * | 8/2004 | Kobayashi | ................... | 455/88 |
| 2002/0010617 A1 * | 1/2002 | Hamaguchi et al. | .......... | 705/10 |

FOREIGN PATENT DOCUMENTS

| | | |
|---|---|---|
| EP | 1 075 159 A2 | 2/2001 |
| JP | 7-38960 | 2/1995 |
| JP | 8-205239 | 8/1996 |
| KR | 1999-59613 | 7/1999 |
| KR | 2000-30200 | 6/2000 |
| KR | 2001-15972 | 3/2001 |
| WO | 00/51293 | 8/2000 |
| WO | WO 00/69186 | 11/2000 |
| WO | 00/76120 | 12/2000 |
| WO | 01/03371 | 1/2001 |
| WO | 01/48977 | 7/2001 |

* cited by examiner

*Primary Examiner*—Lee Nguyen
*Assistant Examiner*—Sanh Phu
(74) *Attorney, Agent, or Firm*—Fitzpatrick, Cella, Harper & Scinto

(57) ABSTRACT

This invention solves various problems associated with apparatus registration and communications after registration in an n:n communication system based on, e.g., a Bluetooth protocol. Information of a newly registered wireless communication apparatus is sent to already registered wireless communication apparatuses. A communication with the already registered apparatus starts by sending a Page message based on the Bluetooth protocol. When an apparatus that output a registration request in response to an Inquiry message based on the Bluetooth protocol is selected, identification information of the selected apparatus is stored. Upon registration, already registered apparatuses are not displayed.

5 Claims, 9 Drawing Sheets

SYSTEM BLOCK DIAGRAM

FIG. 1   SYSTEM BLOCK DIAGRAM

FIG. 2 BLOCK DIAGRAM OF FACSIMILE

ARRANGEMENT OF PC

BLOCK DIAGRAM OF PRINTER

OPERATION FLOW CHART OF FIRST EMBODIMENT
DESCRIPTION OF OPERATION ON REGISTRATION REQUEST SIDE

OPERATION FLOW CHART OF FIRST EMBODIMENT DESCRIPTION OF OPERATION ON REGISTRATION RECEPTION SIDE

OPERATION FLOW CHART UPON COMMUNICATION
BETWEEN WIRELESS COMMUNICATION APPARATUSES

COMMUNICATION APPARATUS AND SYSTEM, AND CONTROL METHOD

FIELD OF THE INVENTION

The present invention relates to a communication apparatus which can communicate with a plurality of terminals by, e.g., Bluetooth.

BACKGROUND OF THE INVENTION

Wireless terminals such as cordless telephone systems, wireless LANs, and the like have prevailed remarkably. Such wireless communication system is constituted by a master apparatus and a plurality of slave apparatuses.

In these apparatuses, their ID numbers are registered before they are used, so as not to interfere with other wireless systems. In this case, ID numbers are manually registered between the master and slave apparatuses.

As an example except for a cordless telephone system in which master and slave apparatuses are registered to have one-to-one correspondence, Japanese Patent Laid-Open No. 7-038960 has proposed a technique that can register a slave apparatus having different IDs in a master apparatus.

Also, Japanese Patent Laid-Open No. 8-205239 (U.S. Pat. No. 5,802,477) has proposed a technique that can register one slave apparatus in a plurality of master apparatuses.

On the other hand, in a terminal that makes a wireless communication based on Bluetooth that has increasingly received a lot of attention in recent years, since Bluetooth aims at making communications among arbitrary terminals, there is no notion of registration.

However, when Bluetooth terminals are used without registration as in prior art, since a communication starts by transmitting an Inquiry message that an arbitrary terminal can receive, a response message may be received from a wireless terminal to which the user does not want to connect, and the ID number and the like of that wireless terminal may be displayed.

For example, when the user wants to make wireless communications among wireless terminals in a house, a wireless terminal in a neighboring house may receive an Inquiry message, and may send a response message. When a response message is received from a wireless terminal to which the user does not want to connect, and the name and ID number of that terminal are displayed, the operator must determine if a communication can be made with that terminal, thus requiring a complicated procedure. Also, data may be erroneously sent to a wireless terminal in a neighboring house.

On the other hand, the conventional wireless communication system is a 1:n communication system, while a wireless communication system based on Bluetooth is an n:n communication system. For this reason, the number of combinations of communication paths is very large, and it is difficult to manually register for all combinations.

SUMMARY OF THE INVENTION

It is an object of the present invention to allow easy registration of apparatuses in, e.g., Bluetooth.

It is another object of the present invention to simplify a communication start sequence to a registered apparatus upon making a communication based on, e.g., Bluetooth.

It is still another object of the present invention to prevent operation errors when registering an apparatus to be used in, e.g., a Bluetooth communication.

It is still another object of the present invention to solve various problems in an n:n communication system.

According to one aspect of the present invention, the forgoing object is attained by providing a wireless communication apparatus comprising: registration means for registering identification information of a first wireless terminal to which permission to communicate wirelessly is to be granted; and informing means for sending information associated with the first wireless terminal registered by the registration means to other already registered wireless communication apparatuses in response to registration by the registration means.

According to a preferred aspect of the present invention, the forgoing object is attained by providing a wireless communication system having a plurality of wireless communication apparatuses for making a communication based on a Bluetooth protocol, a first wireless communication apparatus comprising: registration means for registering identification information of a wireless terminal to which permission to communicate wirelessly is to be granted; and informing means for sending the identification information of the wireless terminal registered by the registration means to a second wireless communication apparatus, and the second wireless communication apparatus comprising: storage means for storing the received identification information, wherein when a wireless communication is made with the wireless communication terminal, the identification information of which is stored in the storage means, a connection sequence starts by sending a Page message based on the Bluetooth protocol.

According to another preferred aspect of the present invention, the forgoing object is attained by a wireless communication system having a plurality of wireless communication apparatuses for making a communication based on a Bluetooth protocol, a first wireless communication apparatus comprising: sending means for sending an Inquiry message upon setting a registration mode in which identification information of another wireless communication apparatus to which permission to communicate is to be granted can be registered; display means for displaying information associated with wireless communication apparatuses which output responses to the Inquiry message; and storage means for storing identification information of the wireless communication apparatus selected based on the information displayed by the display means.

According to still another preferred aspect of the present invention, the forgoing object is attained by providing a wireless communication system having a plurality of wireless communication apparatuses for making a wireless communication using a Bluetooth protocol, a first wireless communication apparatus comprising: means for switching to a registration mode for registering identification information of another wireless communication apparatus to which permission to communicate is granted; and means for sending a message which instructs a second wireless communication apparatus to register information that contains identification information and usable profile type information of the first wireless communication apparatus to the second wireless communication apparatus in the registration mode, the second wireless communication apparatus comprising: means for registering the information that contains the identification information and usable profile type information of the first wireless communication apparatus, and sending a message which instructs the first wireless communication apparatus to register information that contains identification information and usable profile type information of the second wireless communication apparatus to the first wireless communication apparatus upon receiving the message, and the first wireless communication apparatus registering the information that contains the identification information and usable profile type information of the second wireless communication apparatus upon receiving the message.

According to still another preferred aspect of the present invention, the forgoing object is attained by providing a wireless communication apparatus for making a wireless communication based on a Bluetooth protocol, comprising: registration means for registering identification of a wireless terminal to which permission to communicate wirelessly is to be granted; and display means for, when information associated with a wireless communication apparatus, which output a response to an Inquiry message based on the Bluetooth, is displayed, displaying information associated with the wireless communication apparatus, which output the response to the Inquiry message, on the basis of the identification information registered by the registration means and identification information of the wireless communication apparatus, which output the response to the Inquiry message.

According to still another preferred aspect of the present invention, the forgoing object is attained by providing a communication apparatus comprising: storage means for storing information associated with other communication apparatus; sending means for sending a predetermined message to the other communication apparatus; reception means for receiving a response message to the message sent by the sending means; and display means for displaying information associated with a communication apparatus that sent the response message received by the reception means, wherein the display means displays information associated with a communication apparatus which is not stored in the storage means.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

Preferred embodiments of the present invention will be described below with reference to the accompanying drawings.

<Hardware Arrangement>

Figure 1:
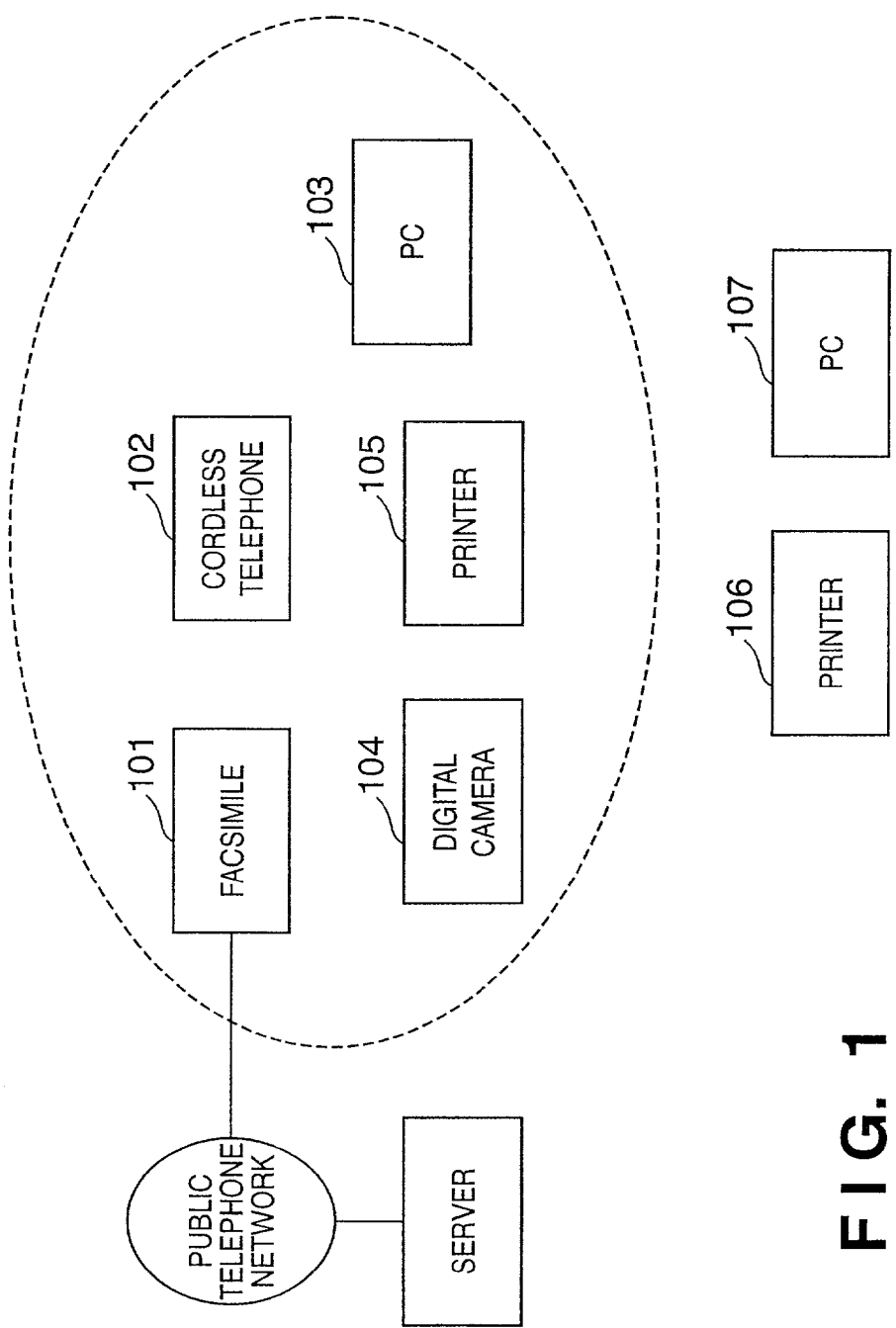
FIG. 1 is a block diagram of a system according to an embodiment of the present invention.

FIG. 1 is a block diagram of a system of this embodiment. Referring to FIG. 1, reference numeral 101 denotes a facsimile which serves as a first wireless communication apparatus. The facsimile 101 is connected to a public communication line, and can exchange data with other communication apparatuses via wireless communications based on Bluetooth.

Reference numeral 102 denotes a cordless telephone which serves as a second wireless communication apparatus, and can make a voice communication based on Bluetooth. Reference numeral 103 denotes a PC (personal computer), which serves as a third wireless communication apparatus, and can make a wireless data communication based on Bluetooth when a Bluetooth card is inserted into its PC card slot. Reference numeral 104 denotes a digital camera, which serves as a fourth wireless communication apparatus, and has a function of sending images photographed by the camera by Bluetooth. Reference numeral 105 denotes a printer, which serves as a fifth wireless communication apparatus, and has a function of printing data received from another wireless communication apparatus by Bluetooth. Reference numeral 106 denotes a printer, which serves as a sixth wireless communication apparatus, and has a function of printing data received from another wireless communication apparatus by Bluetooth. Reference numeral 107 denotes a PC, which serves as a seventh wireless communication apparatus, and can make a wireless data communication based on Bluetooth when a Bluetooth card is inserted into its PC card slot. Assume that the printer 106 and PC 107 belong to a group (e.g., possessed by a neighbor) different from that of the wireless communication apparatuses 101 to 105.

Figure 2:
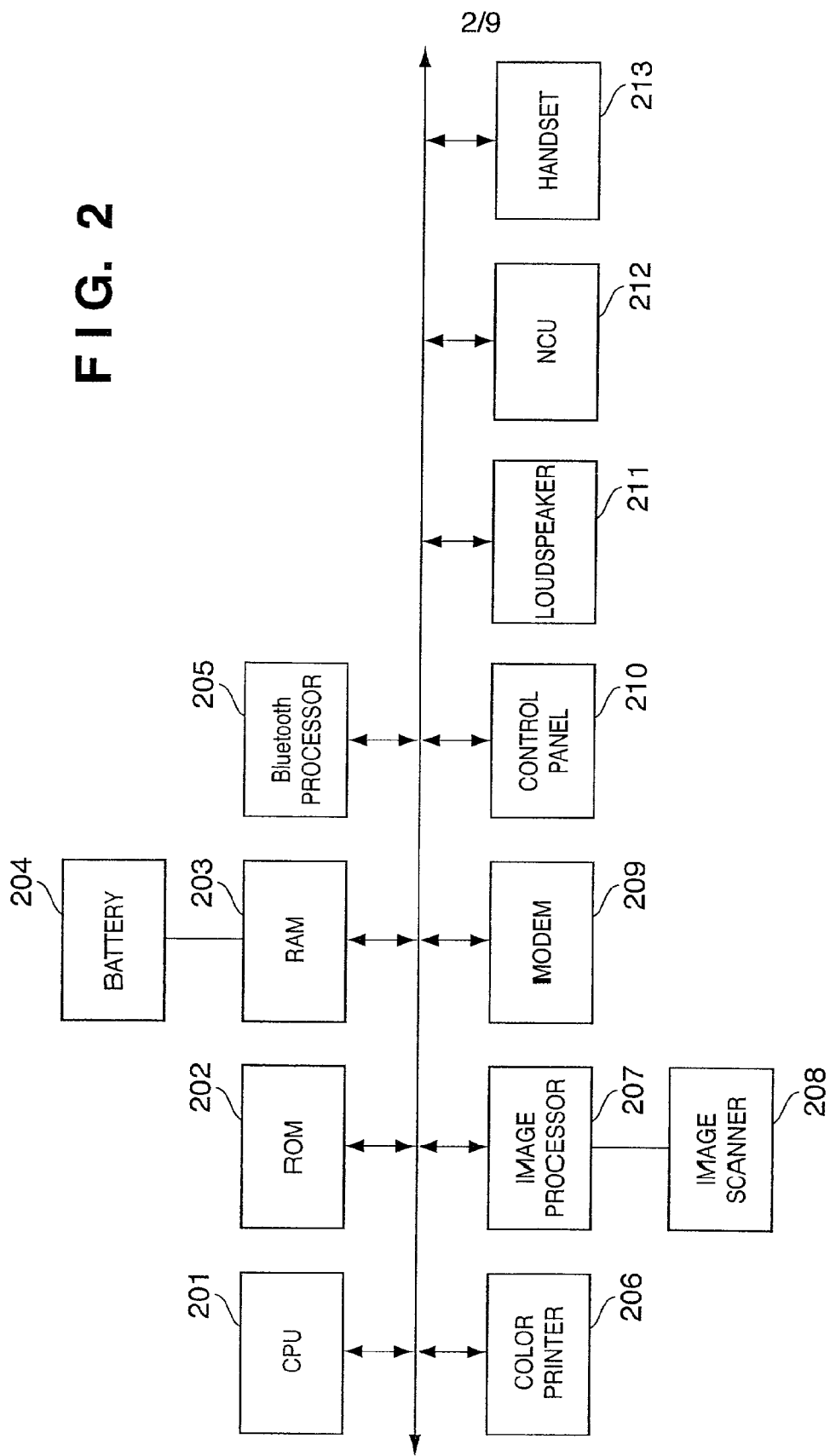
FIG. 2 is a block diagram of a facsimile 101 in the embodiment of the present invention.

FIG. 2 is a block diagram showing the internal arrangement of the facsimile as the first wireless communication apparatus. Referring to FIG. 2, reference numeral 201 denotes a CPU as a controller of the apparatus main body; 202, a ROM for storing various programs of the CPU and permanent data; and 203, an SRAM which is used to register and record registration data (various software switches, communication destination data, the telephone number and abbreviation of the apparatus, and registered ID information of wireless terminals and the like) required for the system. The SRAM 203 is backed up by a primary battery 204 so as not to lose data when a main power supply is turned off. Reference numeral 205 denotes a Bluetooth processor used when this apparatus makes a wireless communication with another wireless terminal. The Bluetooth processor 205 comprises an LSI with a built-in CPU for assembling/disassembling data to/from a predetermined frame format, making frequency hopping control, and executing a Bluetooth protocol process, and a 2.4-GHz RF circuit.

Reference numeral 206 denotes a known ink-ejection color printer as a printer of this apparatus. The color printer 206 prints binary data on a print paper sheet at a print resolution of 360 dpi while moving a cartridge that integrates an ink tank and ink-jet unit in the main scan direction of the print paper sheet. A color cartridge that combines C, M, Y, and K ink tanks and ink-jet units, and a monochrome cartridge that combines a monochrome ink tank and ink-jet unit are available. Whether the color or monochrome cartridge is mounted on the printer can be discriminated by the CPU based on the arrangement of electrical contacts of the cartridge. The maximum print width upon monochrome printing is B4, and the maximum print width upon color printing, i.e., upon mounting the color cartridge, is A4.

Reference numeral 207 denotes an image processor which executes image processes such as a binarization process for converting multi-valued image data into a binary image, image enlargement/reduction, and the like which are required on the main body side. The image processor 207 executes resolution conversion for converting the resolution of image data into a resolution of 360 dpi of the printer 206, and transfers print data to the color printer.

Reference numeral 208 denotes an image scanner which is used to scan a document to be sent as facsimile data, or to form a color copy, and comprises a CIS (Contact Image Sensor) and the like.

Reference numeral 209 denotes a modem (which has a DTMF signal recognition function in addition to V.29, V.21, and V.27ter in this embodiment) used to make a facsimile communication in a known G3 mode or the like.

Reference numeral 210 denotes a main body control panel, which comprises a key input unit used to make dial operation and various operation instructions, and to make various setups, and a liquid crystal display unit and LED used to indicate apparatus status and various data; 211, a loudspeaker for outputting various alarm tones, ringing tones, and an audio signal on the line; 212, a known NCU for interfacing between the analog telephone line and the apparatus; and 213, a handset used to make conversation using this apparatus.

Figure 3:
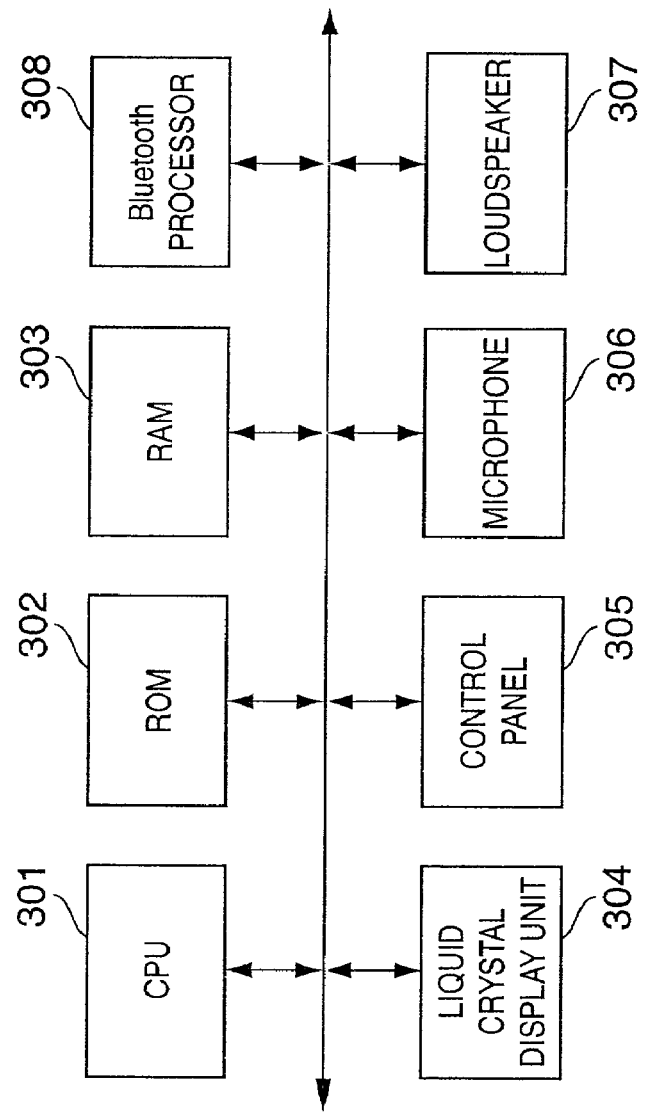
FIG. 3 is a block diagram of a cordless telephone 102 in the embodiment of the present invention.

FIG. 3 is a block diagram showing the internal arrangement of the cordless telephone as the second wireless communication apparatus. Referring to FIG. 3, reference numeral 301 denotes a CPU for controlling the cordless telephone; 302, a ROM for storing various control programs of the CPU; 303, a RAM for registering and recording ID information and the like of registered wireless terminals and the like; 304, a liquid crystal display unit for making various displays; 305, a control panel having a key input unit, which is used to make dial operation and various operation instructions, and to make various setups; 306, a microphone; 307, a loudspeaker; and 308, a Bluetooth processor, which comprises an LSI with a built-in CPU for assembling/disassembling data to/from a predetermined frame format, making frequency hopping control, and executing a Bluetooth protocol process, and a 2.4-GHz RF circuit.

Figure 4:
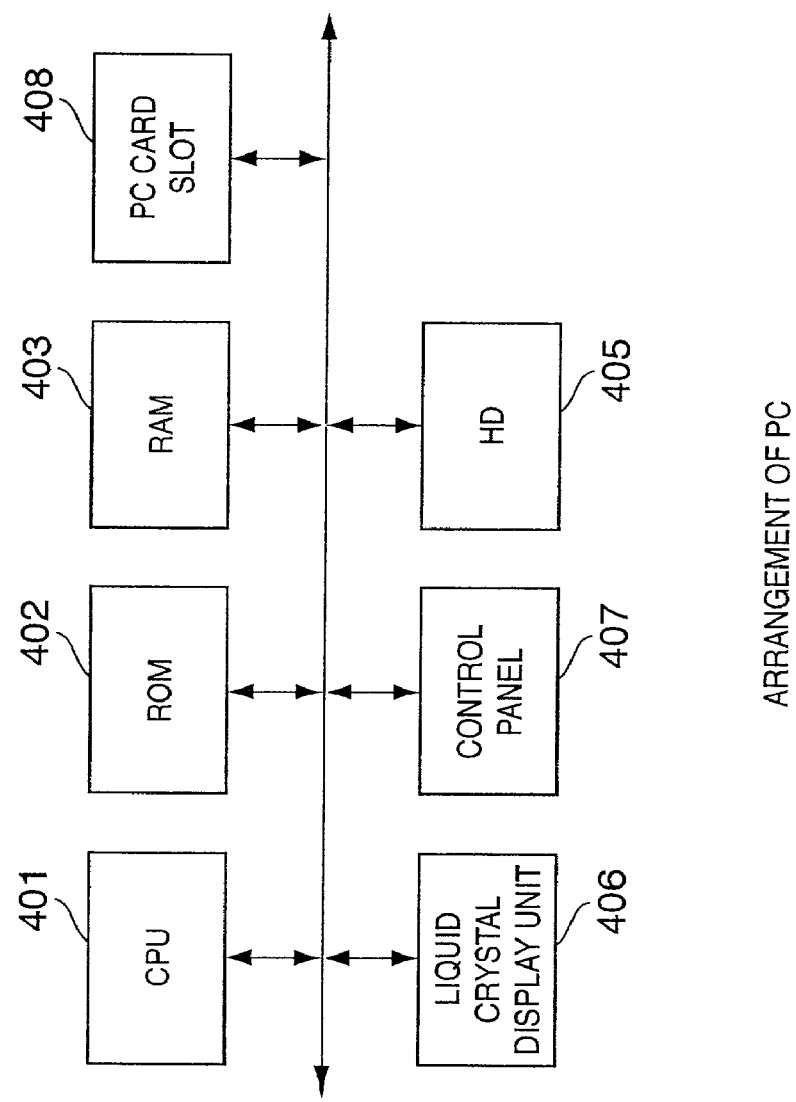
FIG. 4 is a block diagram of a PC 103 in the embodiment of the present invention.

FIG. 4 is a block diagram showing the internal arrangement of the PC as the third wireless communication apparatus. Referring to FIG. 4, reference numeral 401 denotes a CPU for controlling the apparatus; 402, a ROM for storing various programs of the CPU; 403, a RAM for registering and recording ID information and the like of registered wireless terminals and the like; 405, a hard disk; 406, a liquid crystal display unit for making various displays; and 407, a control panel which comprises a keyboard, pointing device, and the like.

Reference numeral 408 denotes a PC card slot which can receive a Bluetooth wireless communication card to make a wireless data communication. The Bluetooth wireless communication card comprises an LSI with a built-in CPU for assembling/disassembling data to/from a predetermined frame format, making frequency hopping control, and executing a Bluetooth protocol process, and a 2.4-GHz RF circuit. Note that the PC 107 as the seventh wireless communication apparatus has the same arrangement as that shown in FIG. 4.

Figure 5:
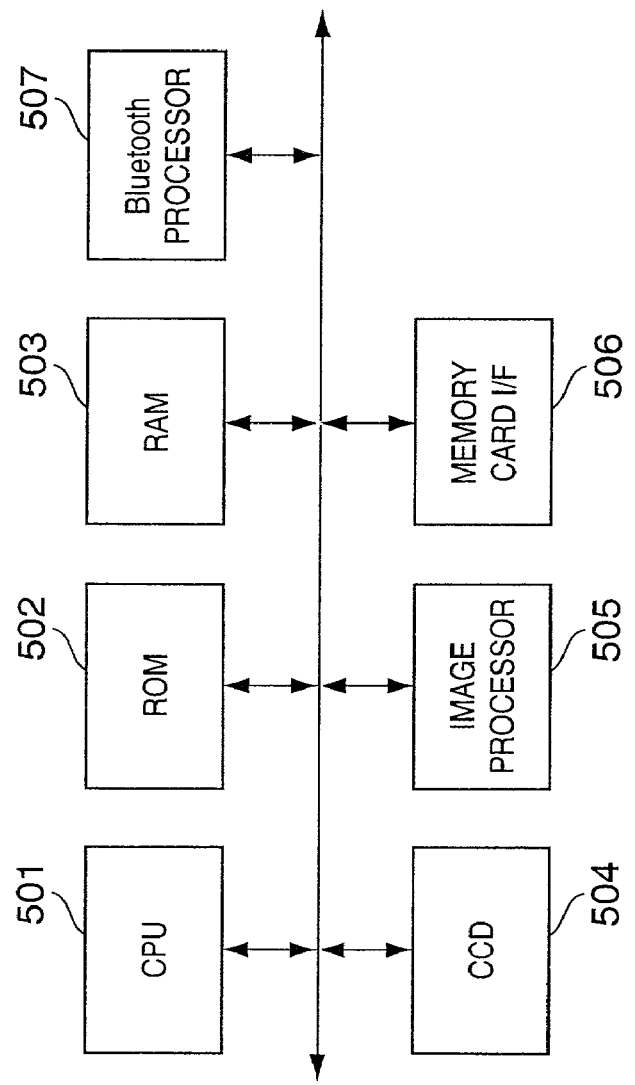
FIG. 5 is a block diagram of a digital camera 104 in the embodiment of the present invention.

FIG. 5 is a block diagram showing the internal arrangement of the digital camera as the fourth wireless communication apparatus. Referring to FIG. 5, reference numeral 501 denotes a CPU for controlling the apparatus; 502, a ROM for storing various programs of the CPU; 503, a RAM for registering and recording ID information and the like of registered wireless terminals and the like, and for storing photographed images; 504, a CCD for photographing; 505, an image processing LSI for making compression and the like of an image upon storing an image photographed by the CCD 504 in the RAM 503 or a memory card; 506, a memory card interface (I/F) for interfacing with a memory card for storing images; and 507, a Bluetooth processor, which comprises an LSI with a built-in CPU for assembling/disassembling data to/from a predetermined frame format, making frequency hopping control, and executing a Bluetooth protocol process, and a 2.4-GHz RF circuit.

Figure 6:
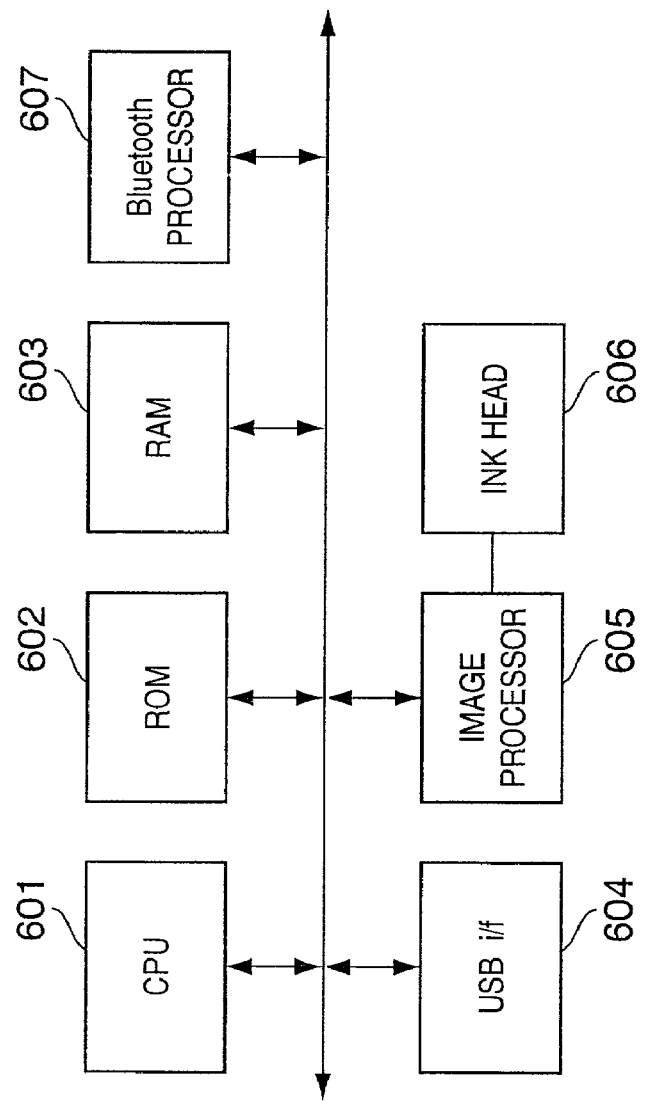
FIG. 6 is a block diagram of a printer 105 in the embodiment of the present invention.

FIG. 6 is a block diagram showing the internal arrangement of the printer as the fifth wireless communication apparatus. Referring to FIG. 6, reference numeral 601 denotes a CPU for controlling the apparatus; 602, a ROM for storing various programs of the CPU; 603, a RAM for registering and recording ID information and the like of registered wireless terminals and the like; 604, a USB interface; 605, an image conversion processor for making image conversion to print an image; 606, an ink-jet head used to print an image from the image conversion processor; and 607, a Bluetooth processor, which comprises an LSI with a built-in CPU for assembling/disassembling data to/from a predetermined frame format, making frequency hopping control, and executing a Bluetooth protocol process, and a 2.4-GHz RF circuit.

Figure 7:
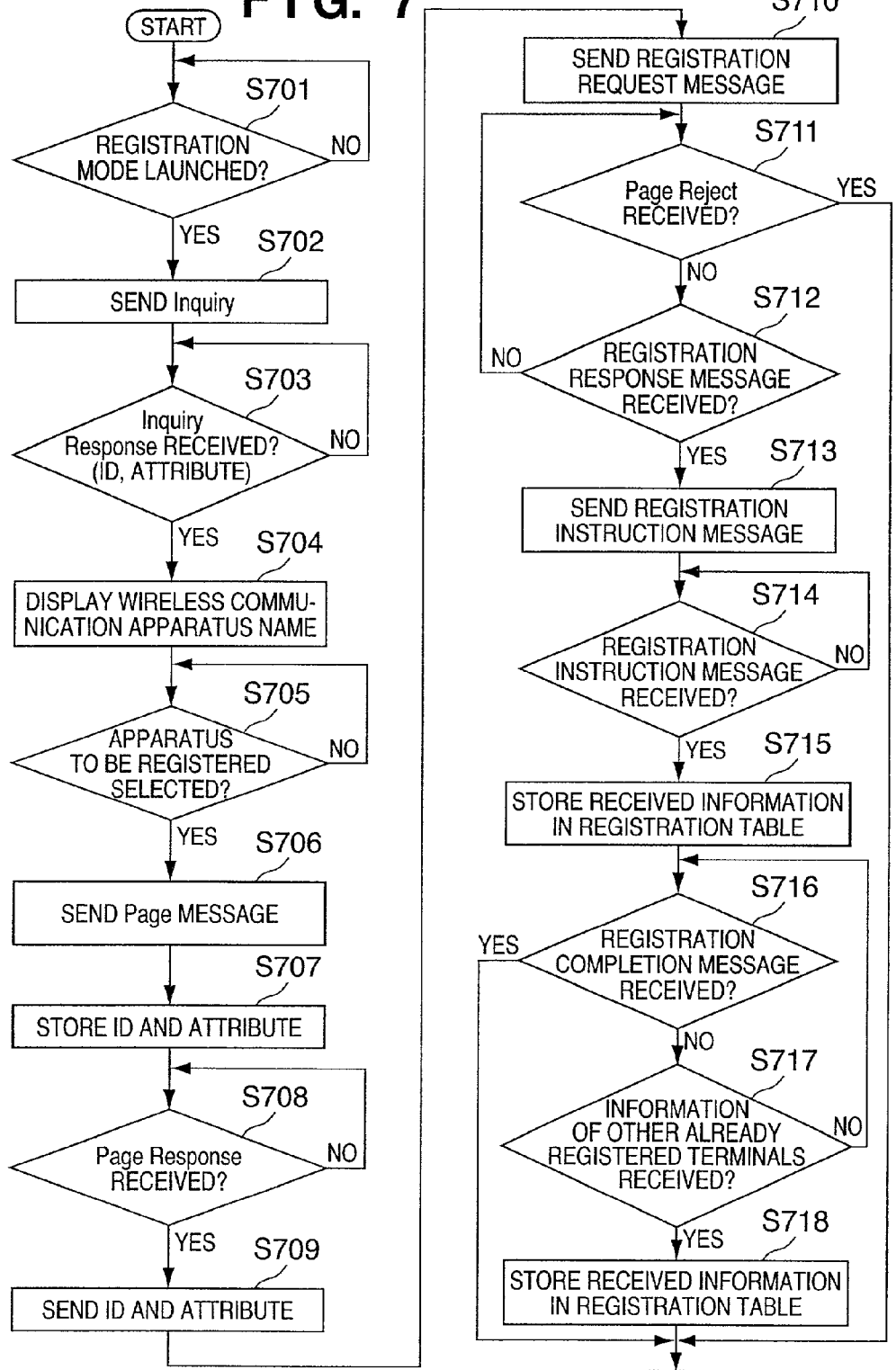
FIG. 7 is a flow chart showing the operation of a registration request-side apparatus in the embodiment of the present invention.
Figure 8:
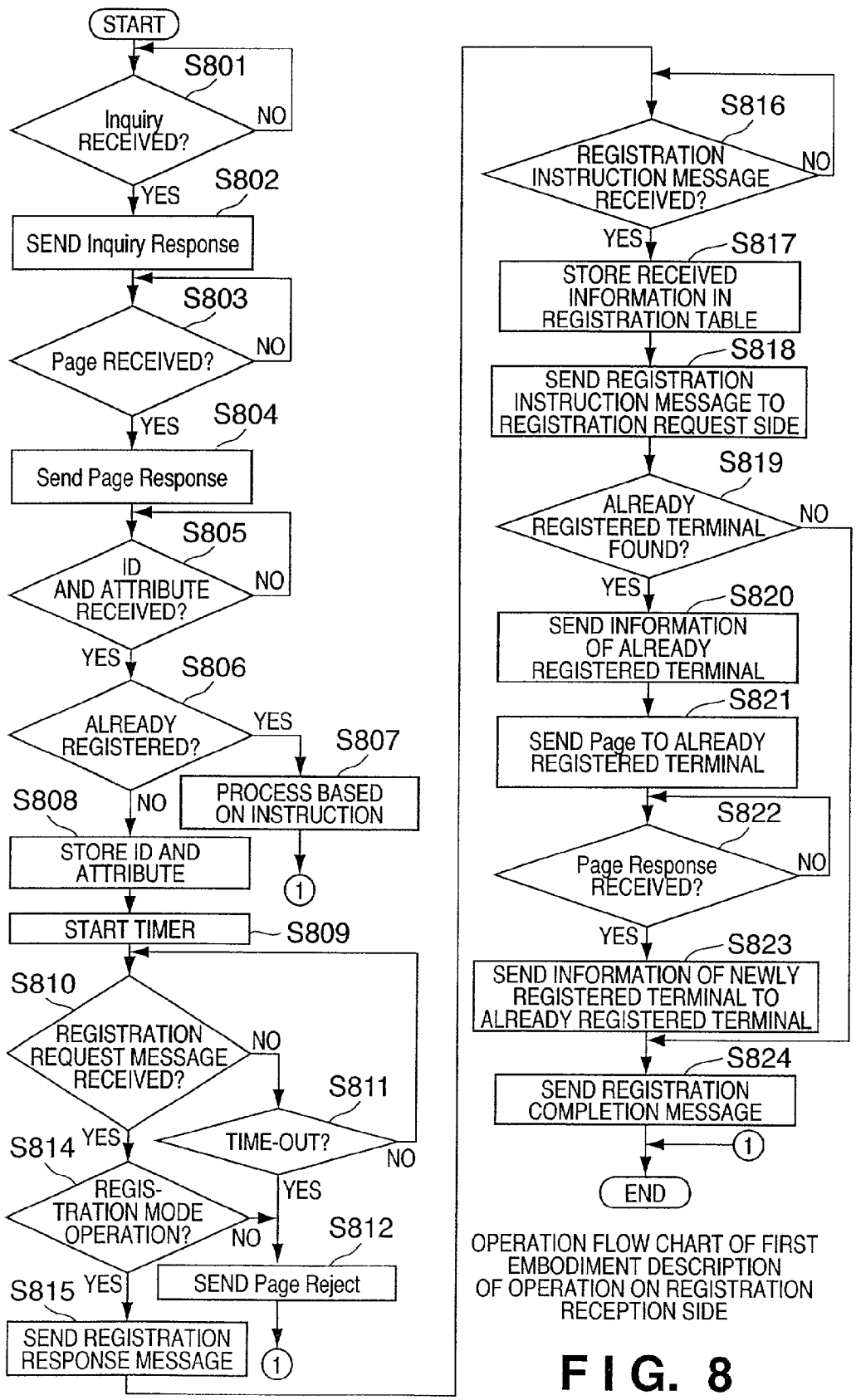
FIG. 8 is a flow chart showing the operation of a registration reception-side apparatus in the embodiment of the present invention.

The operation upon registering other wireless communication apparatuses in the facsimile 101 as the first wireless communication apparatus will be explained below using FIGS. 7 and 8.

<Registration of First Terminal>

The operation for registering the cordless telephone 102 as the second wireless communication apparatus in the facsimile 101 as the first wireless communication apparatus will be explained below.

A registration mode is launched by key operations on the cordless telephone 102. If the registration mode is launched (S701), the cordless telephone 102 begins to send an Inquiry message as an inquiry number of Bluetooth (S702). Upon receiving the Inquiry message (S801), the facsimile 101, PC 103, digital camera 104, and printer 105 send Inquiry Response messages as responses (S802). Note that each apparatus sends, as an Inquiry Response message, the ID number as its own Bluetooth device address, and information indicating attributes of each apparatus. For example, the facsimile 101 sends information "usable profile=printing profile, still image profile, cordless telephony profile, apparatus name=FAX1"; the PC 103 sends information "usable profile=OBEX profile, printing profile, apparatus name=PC1" the digital camera 104 sends information "usable profile=still image profile, apparatus name=DC1"; and the printer 105 sends information "usable profile=printing profile, apparatus name=PRN1".

Upon receiving the Inquiry Response messages (S703), the cordless telephone 102 extracts the ID number (Bluetooth device addresses) and attribute information of the facsimile 101, PC 103, digital camera 104, and printer 105 that output the Inquiry Response messages from the Inquiry Response messages, and checks if an already registered apparatus or apparatuses are included. If an already registered apparatus or apparatuses are found, the ID numbers and attribute information of apparatuses other than these apparatuses are displayed on the display unit in correspondence with each other (S704). In this description, since none of apparatuses are registered, the received ID numbers and attribute information of all the apparatuses are displayed on the display unit in correspondence with each other.

If the operator of the cordless telephone 102 selects the facsimile 101 from the displayed ID numbers and attribute information (S705), the cordless telephone 102 sends a Page message to the facsimile 101 using the ID number of the facsimile 101 to call the facsimile 101 (S706). The cordless telephone 102 stores the selected ID number and attribute information in the RAM 303 (S707).

Upon receiving the Page message (S803), the facsimile 101 sends a Page Response message to the cordless telephone 102 to inform the cordless telephone 102 of reception of the Page message (S804). Upon receiving the Page Response message (S708), the cordless telephone 102 sends the ID number as its Bluetooth device address and information indicating attributes ("usable profile=cordless telephony profile, apparatus name=CT1") to the facsimile 101 (S709), and further sends a registration request message to the facsimile 101 (S710).

Upon receiving the ID number and attribute information of the cordless telephone 102 (S805), the facsimile 101 checks if the received ID number and attribute information have already been registered in a registration table (to be described later) (S806). If the ID number and attribute information have already been registered, the facsimile 101 executes a process on the basis of an instruction (e.g., to print data) from the apparatus that output the inquiry (S807). If the received ID number and attribute information have not been registered in the registration table yet, the facsimile 101 stores the received ID number and attribute information in the RAM 203 (S808) and starts a timer (S809). If a registration request message is received from the cordless telephone 102 before the timer reaches time-out (S810, S811), the facsimile 101 displays a message for prompting the user to set a registration mode on the display unit. In this state, if the operator operates the console of the facsimile 101 within a predetermined period of time to start the registration mode (S814), the facsimile 101 sends a registration response message to the cordless telephone 102 (S815).

If the registration request message cannot be received before the timer started in step S809 reaches time-out or if the operator of the facsimile 101 does not make any operation for setting the registration mode within a predetermined period of time, the facsimile 101 sends a Page Reject message to the cordless phone 102 (S812) to end the process.

If the cordless telephone 102 receives a Page Reject message (S711), it ends the process; if the cordless telephone 102 receives a registration response message in place of a Page Reject message (S712), it sends, to the facsimile 101, a registration instruction message that instructs the facsimile 101 to register the ID number, usable profile, and apparatus name of the cordless telephone 102 output in step S709 (S713).

Upon receiving the message (S816), the facsimile 101 stores information stored in the RAM 203 in step S808, i.e., usable profile=cordless telephony profile and apparatus name=CT1, in the registration table in the RAM 203 in correspondence with the ID number of the cordless telephone 102 (S817). Subsequently, the facsimile 101 sends, to the cordless telephone 102, a registration instruction message that instructs the cordless telephone 102 to register the ID number, usable profile, and apparatus name of the facsimile 101, which were output as the Inquiry Response message in step S802 (S818).

Upon receiving the registration instruction message from the facsimile 101 (S714), the cordless telephone 102 stores the information of the facsimile 101 stored in the RAM 303 in step S707, i.e., usable profile =printing profile, still image profile, and cordless telephony profile, and apparatus name=FAX1, in the registration table in the RAM 303 in correspondence with the ID number of the facsimile 101 (S715).

The facsimile 101 searches to see if another already registered terminal is present (S819). In this description, since no terminals other than the cordless telephone 102 are registered in this stage, it is determined that no terminals are registered, and the facsimile 101 sends a registration completion message (S824), thus ending the registration process of the first terminal.

Upon receiving the registration completion message from the facsimile 101 (S716), the cordless telephone 102 ends the registration process.

<Registration Operation of Second Terminal>

Subsequently, the operation for registering the PC 103 as the third wireless communication terminal in the facsimile 101 as the first wireless communication apparatus will be explained below.

Communication software stored in the hard disk of the PC 103 is launched to establish connection to a Bluetooth card. After that, the Bluetooth card can be controlled by inputting AT commands.

In order to register the Bluetooth card, if the operator of the PC 103 inputs AT@REG, the Bluetooth card starts a registration mode. If the registration mode is launched (S701), the PC 103 begins to send an Inquiry message (S702). Upon receiving the Inquiry message (S801), the facsimile 101, cordless telephone 102, digital camera 104, and printer 105 send Inquiry Response messages as responses to inform the PC 103 of their ID numbers as the Bluetooth device addresses and attribute information (S802).

Upon receiving the Inquiry Response messages (S703), the PC 103 checks if one or a plurality of the facsimile 101, cordless telephone 102, digital camera 104, and printer 105 have already been registered. If an already registered apparatus or apparatuses are found, the PC 103 displays the ID numbers and attribute information of apparatuses except for those of such apparatus (cordless telephone 102 in this embodiment) on the display unit (S704) If the operator of the PC 103 selects the facsimile 101 from the displayed ID numbers and attribute information (S705), the PC 103 sends a Page message to the facsimile 101 (S706). Also, the PC 103 stores the ID number and attribute information of the selected facsimile 101 in a memory in the Bluetooth card (S707).

Upon receiving the Page message (S803), the facsimile 101 sends a Page Response message to inform the PC 103 of reception of the Page message (S804). Upon receiving the Page response message (S708), the PC 103 sends the ID number as the Bluetooth device address and attribute information ("usable profile=OBEX profile, printing profile, apparatus name=PC1") to the facsimile 101 (S709). Also, the PC 103 sends a registration request message to the facsimile 101 (S710).

Upon receiving the ID number and attribute information of the PC 103 (S805), the facsimile 101 checks if the received ID number and attribute information have already been registered in the registration table (S806). If the ID number and attribute information have already been registered, the facsimile 101 executes a process on the basis of an instruction (e.g., to print data) from the apparatus that output the inquiry (S807). If the received ID number and attribute information have not been registered in the registration table yet, the facsimile 101 stores the received ID number and attribute information in the RAM 203 (S808) and starts the timer (S809). If a registration request message is received from the PC 103 before the timer reaches time-out (S810, S811), the facsimile 101 displays a message for prompting the user to set a registration mode on the display unit. In this state, if the operator operates the console of the facsimile 101 within a predetermined period of time to start the registration mode (S814), the facsimile 101 sends a registration response message to the PC 103 (S815).

If a registration request message cannot be received before the timer started in step S809 reaches time-out or if the operator does not make any operation for setting the registration mode within a predetermined period of time, the facsimile 101 sends a Page Reject message to the PC 103 (S812) to end the process.

If the PC 103 receives a Page Reject message (S711), it ends the process; if the PC 103 receives a registration response message (S712), it sends, to the facsimile 101, a registration instruction message that instructs the facsimile 101 to register the ID number, usable profile, and apparatus name of the PC 103 output in step S709 (S713).

Upon receiving the message (S816), the facsimile 101 stores information of the PC 103 stored in the RAM 203, i.e., "usable profile=OBEX profile and printing profile, and apparatus name=CT1", in the registration table in the RAM 203 in correspondence with the ID number of the PC 103 (S817). Subsequently, the facsimile 101 sends, to the PC 103, a registration instruction message that instructs the PC 103 to register the ID number, usable profile, and apparatus name of the facsimile 101, which were output as the Inquiry Response message in step S802 (S818).

Upon receiving the registration instruction message from the facsimile 101 (S714), the PC 103 stores the information of the facsimile 101 stored in the memory in the Bluetooth card in step S707, i.e., usable profile=printing profile, still image profile, and cordless telephony profile, and apparatus name=FAX1, in the registration table in the memory in the Bluetooth card in correspondence with the ID number of the facsimile 101 (S715).

The facsimile 101 searches to see if another already registered terminal is present (S819). As a result of search, it is found that the cordless telephone 102 has already been registered. The facsimile 101 sends a registered terminal information message that contains the ID number and attribute information (apparatus name (CT1), usable profile name (cordless telephony profile)) of the cordless telephone 102 to the PC 103 (S820).

Upon receiving the message (S717), the PC 103 stores the usable profile name and apparatus name in the registration table in the Bluetooth card in correspondence with the ID number of the cordless telephone 102 (S718).

The facsimile 101 then starts a process for also registering the PC 103 in the cordless telephone 102. The facsimile 101 sends a Page message to the cordless telephone 102 (S821).

Upon receiving a Page Response message from the cordless telephone 102 (S822), the facsimile 101 launches a registration information transfer mode. That is, the facsimile 101 sends a registered terminal information message that contains the ID number, apparatus name, and usable profile of the newly registered PC 103 to the cordless telephone 102 (S823). Upon receiving the message, the cordless telephone 102 stores the apparatus name and usable profile in the registration table in the memory in correspondence with the ID number of the PC 103.

Upon completion of this information transfer, the facsimile 101 sends a registration completion message to the PC 103 and cordless telephone 102 (S824), thus ending the registration process. Upon receiving the registration completion message, the PC 103 and cordless telephone 102 end the registration process (S716).

With the aforementioned sequence, the facsimile 101, cordless telephone 102, and PC 103 can be registered as wireless communication apparatuses which can communicate with each other.

<Registration Operation of Third and Subsequent Terminals>

The same process is done upon registering the third and subsequent wireless communication apparatuses. The digital camera 104 is registered in the facsimile 101 as apparatus name=DC1 and usable profile=still image profile.

Upon completion of the registration process, the facsimile 101 sends the ID numbers, apparatus names, and usable profiles of the cordless telephone 102 and PC 103, which have already been registered, to the digital camera 104 (S820). On the other hand, the facsimile 101 sends the ID number, apparatus name, and usable profile of the digital camera 104 to the cordless telephone 102 and PC 103 (S823).

The printer 105 is registered in the facsimile 101 as apparatus name=PRN1 and usable profile=printing profile.

Upon completion of the registration process, the facsimile 101 sends the ID numbers, apparatus names, and usable profiles of the cordless telephone 102, PC 103, and digital camera 104, which have already been registered, to the printer 105 (S820). On the other hand, the facsimile 101 sends the ID number, apparatus name, and usable profile of the printer 105 to the cordless telephone 102, PC 103, and digital camera 104 (S824).

With the aforementioned sequence, the facsimile 101, cordless telephone 102, PC 103, digital camera 104, and printer 105 can recognize each other as terminals in one group in which they can communicate with each other.

<Operation Upon Communication Between Wireless Communication Apparatuses>

Figure 9:
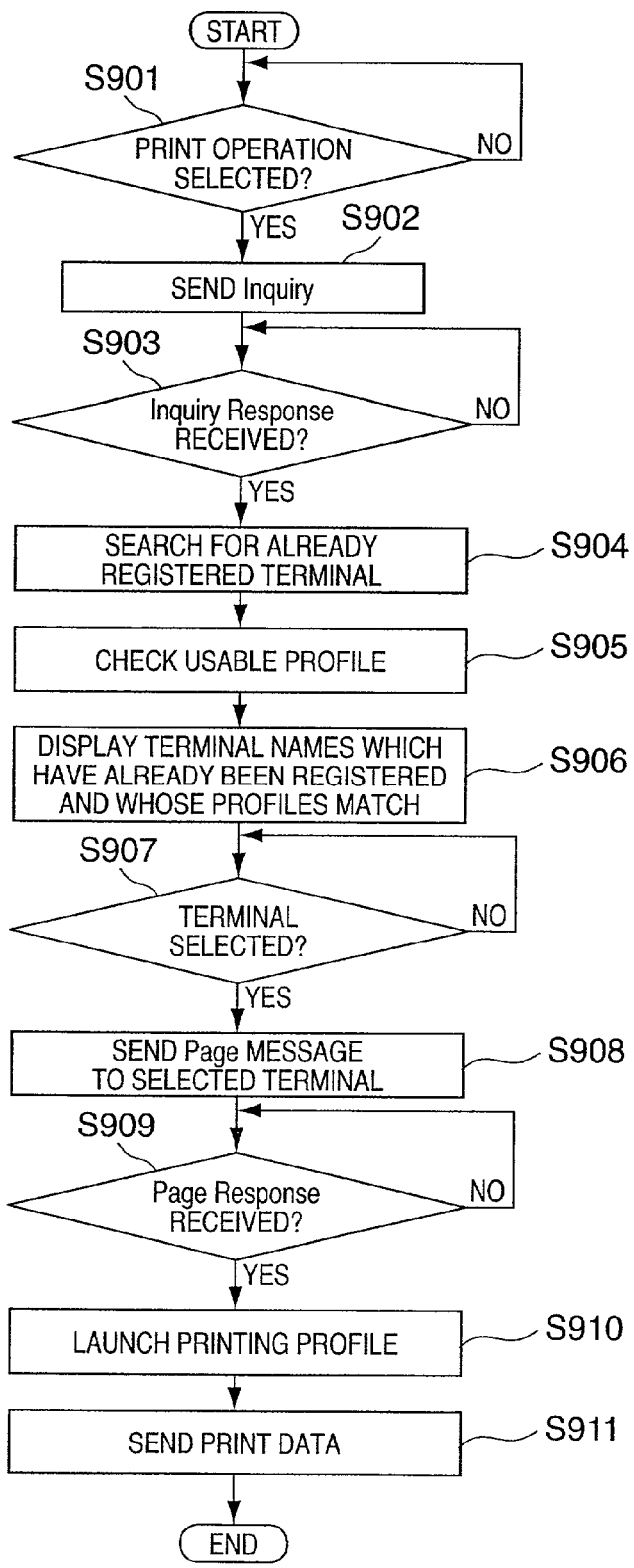
FIG. 9 is a flow chart showing the operation upon making a communication between wireless communication apparatuses in the embodiment of the present invention.

As an example of the operation upon communications between wireless communication apparatuses, the operation for printing a document displayed on the PC 103 will be described below using FIG. 9.

If a print operation is selected at the PC 103 (S901), the Bluetooth card is booted, and begins to send an Inquiry message (S902). In response to this message, all the wireless communication apparatuses within the Bluetooth range, i.e., the facsimile 101, cordless telephone 102, digital camera 104, printer 105 and 106, and PC 107 send Inquiry Response messages to the PC 103.

Upon receiving the Inquiry Response messages (S903), the PC 103 checks with reference to the registration table in the memory if the ID numbers received as the Inquiry Response messages have already been registered in the registration table (S904), and searches apparatuses with the already registered received ID numbers for an apparatus that can use the printing profile required to print (S905).

In this description, since the wireless communication apparatuses that have already been registered in the PC 103 are the facsimile 101, cordless telephone 102, digital camera 104, and printer 105, the printer 106 and PC 107, which are not registered, are excluded from communication targets (S904).

Since the facsimile 101 and printer 105 have printing profiles as their usable profiles among the already registered apparatuses (S905), it is recognized that other wireless communication apparatuses are excluded from communication targets, and the ID numbers and names (FAX1 and PRN1) of the facsimile 101 and printer 105 are displayed on the print process window of the PC 103 (S906).

Assume that the operator of the PC 103 selects FAX1 since he or she is located near the facsimile 101 (S907). The PC 103 sends a Page message to the selected facsimile 101 (S908). Upon receiving that message, the facsimile 101 sends back a Page Response message.

Upon receiving the Page Response message (S909), the PC 103 launches the printing profile (S910), and then sends print data to the facsimile 101 after negotiation of parameters required to print (S911). Upon receiving the print data, the facsimile 101 transfers the data to its internal printer to print the data.

As described above, even when a Bluetooth radio wave can reach the neighboring house, since the names of wireless communication apparatuses which are not registered in advance are not displayed, data can be prevented from being sent to a wrong destination. Also, since the usable profiles and apparatus names are stored in correspondence with the ID numbers, only wireless communication apparatuses that can operate are displayed in correspondence with an application, and a data transmission error to a communication apparatus which cannot operate can be prevented.

The operation when a non-registered terminal attempts to access will be explained below. Assume that the PC 107 which is not registered in the group of the apparatuses 101 to 105 attempts to print at the facsimile 101.

When a print operation is selected at the PC 107, a Bluetooth card is booted and begins to send an Inquiry message. In response to this message, all wireless communication apparatuses within the Bluetooth range, i.e., the facsimile 101, cordless telephone 102, PC 103, digital camera 104, and printers 105 and 106 send Inquiry Response messages to the PC 107.

Upon receiving the Inquiry Response messages, the PC 107 displays the ID numbers of all wireless communication apparatuses from which the Inquiry Response messages were received. Assume that the operator of the PC 107 selects the facsimile 101 to print. The PC 107 then sends a Page message to the facsimile 101 to attempt to establish connection.

Upon receiving the Page message from the PC 107, the facsimile 101 sends a Page Response message. In response to the Page Response message, the facsimile 101 receives the ID number and attribute information from the PC 107. However, since the ID number received from the PC 107 is not registered in the registration table, and no registration request message is sent from the PC 107, the facsimile 101 determines that it cannot communicate with the PC 107, and sends a Page Reject message, thus ending the process. Even when a registration request message is received from a wireless communication apparatus in a neighboring house, since operation for starting the registration mode is never done, a Page Reject message is also sent in such case to end the process.

As described above, even when a non-registered wireless communication apparatus erroneously attempts to establish connection, such connection can be reliably avoided.

(Second Embodiment)

In the first embodiment, when information of a newly registered wireless communication apparatus is sent to the already registered wireless communication apparatuses, Page messages are sent to the individual wireless communication apparatuses to establish connection of wireless channels. However, since information with the same contents need only be sent to the individual wireless communication apparatuses, the registration process can be simplified by sending a broadcast message.

(Third Embodiment)

In the above embodiment, wireless communication apparatuses in the home have been assumed. However, in various other situations, apparatuses can be similarly grouped when they are used.

For example, assume that a plurality of apparatuses are equipped in a closed space environment such as a meeting room of an office. In the meeting room, a whiteboard, projector, and printer are equipped, and users of the meeting room bring their PCs. The whiteboard, projector, and printer are registered in one group as in the first embodiment. Note that individual communication apparatuses can use the following profiles:

whiteboard=OBEX, still image, printing; projector=OBEX, still image; printer=printing; and PC=OBEX, printing The operation for registering a PC as a new member in the meeting room will be explained below. In an environment such as a meeting room, since communication apparatuses to be registered exchange frequently, the registration operation can be done at the registration side unlike in the first embodiment.

When the user inputs a command AT@REG in the PC, the Bluetooth card inserted in the PC launches a registration mode. After the registration mode is launched, the PC begins to send an Inquiry message. Upon receiving the Inquiry message, the whiteboard, projector, and printer send Inquiry Response messages.

Upon receiving the Inquiry Response messages, the PC displays the ID numbers and attribute information of the whiteboard, projector, and printer that output the Inquiry Response messages on its display unit. When the operator of the PC selects the ID number of the whiteboard from the displayed ID numbers, the PC sends a Page message to the whiteboard. Upon receiving a Page Response message from the whiteboard that received the Page message, the PC sends its ID number and attribute information ("usable profile=OBEX profile, printing profile, apparatus name=PC1"), and starts a registration process.

The PC sends to the whiteboard a registration request message containing a password unique to the whiteboard. The whiteboard compares the password in the received registration request message with a password pre-stored in its memory. If the two passwords do not match, the whiteboard sends a registration deny message to the PC to end the registration operation.

On the other hand, if the two passwords match, the whiteboard sends a registration response message to the PC. Upon receiving the registration response message, the PC sends a registration instruction message to the whiteboard.

Upon receiving that message, the whiteboard stores information of the PC, i.e., "usable profile=OBEX profile, printing profile, apparatus name=PC1" in its memory in correspondence with the ID number of the PC. The whiteboard then sends a registration completion message to the PC, thus ending the registration process.

The whiteboard searches for other already registered terminals. Assume that it is found as a result of search that the projector and printer have been registered. The whiteboard sends to the PC a registered terminal information message which contains the ID numbers, apparatus names (PRJ1, PRN1), and usable profile names of the projector and printer. Upon receiving the message, the PC stores the usable profile names and apparatus names in the memory of the Bluetooth card in correspondence with the ID numbers of the projector and printer.

Subsequently, the whiteboard starts a registration process of the PC to the projector and printer. The whiteboard sends Page messages to the projector and printer. Upon receiving Page Response messages from the projector and printer, the whiteboard launches a registered information transfer mode. That is, the whiteboard sends a registered terminal information message that contains the ID number, apparatus name, and usable profile name of the newly registered PC. Upon receiving this message, the projector and printer store the apparatus name and usable profile name in their memories in correspondence with the ID number of the PC 103.

With the aforementioned sequence, a PC as a new member in the meeting room can be registered as a wireless communication apparatus which can communicate with the projector and printer equipped in the meeting room.

(Fourth Embodiment)

In the above embodiment, the ID number and apparatus name of a wireless communication apparatus to be registered are recognized via communications between the apparatuses. However, upon registering the first wireless communication apparatus, the ID number and apparatus name may be input using the console of the wireless communication apparatus which is to receive registration information, thus obtaining the same effect.

In this case, when the wireless communication apparatus which is to receive registration information receives information of a wireless communication apparatus to be registered, it sends information of the newly registered wireless communication apparatus to the already registered wireless communication apparatuses. Also, the apparatus sends information of the already registered wireless communication apparatuses to the newly registered wireless communication apparatus.

In this embodiment, registration can be done by operations at only the apparatus which is to receive registration information, and a password or the like need not be stored.

(Fifth Embodiment)

In the above embodiment, a wireless communication starts by sending an Inquiry message. For example, in the first embodiment, when the PC 103 makes a print operation, it displays the names of communication apparatuses which have already been registered and can use a printing profile among the terminals from which Inquiry Response messages were received.

However, in the first embodiment, if the facsimile 101 cannot use a printing profile, a communication may start from the Page sequence as follows.

When the print operation is launched, the PC 103 confirms usable profiles of the registered wireless communication apparatuses. If the PC confirms that the printer 105 can use a printing profile, it sends a Page message to the printer 105.

Upon receiving a Page Response message from the printer 105, the PC enters the printing profile sequence and, after that, the same process as in the first embodiment can be executed.

As described above, according to the present invention, registration of apparatuses using, e.g., Bluetooth can be simplified.

When a communication is made using, e.g., Bluetooth, a communication start process to the registered apparatus can be simplified.

Operation errors upon registering a communication apparatus using, e.g., Bluetooth can be prevented.

Various problems in an n:n communication system can be solved.

The present invention is not limited to the above embodiments and various changes and modifications can be made within the spirit and scope of the present invention. Therefore, to apprise the public of the scope of the present invention, the following claims are made.

What is claimed is:

1. A wireless communication apparatus comprising:
   a sending device configured to send an Inquiry message upon setting a registration mode for registering identification information of wireless communication terminals;
   a display device configured to display information associated with wireless communication terminals which output responses to the Inquiry message;
   a storage device configured to store identification information of the wireless communication terminal selected based on the information displayed by said display device;
   a denial device configured to deny, when said wireless communication apparatus receives an Inquiry message from a wireless communication terminal having identification information which is not stored in said storage device, a communication with the wireless communication terminal that sent the Inquiry message, unless said wireless communication apparatus receives a request for storing the identification information;
   a notification device configured to make, when said wireless communication apparatus receives the Inquiry message from the wireless communication terminal, a notification to an operator, upon receiving the request; and
   a registration device configured to register, in response to control by the operator based on the notification by said notification device, the identification information of the wireless communication terminal that sent the request.

2. The wireless communication apparatus according to claim 1, wherein said wireless communication apparatus sends information associated with a wireless communication terminal, the information of which is newly stored, to wireless communication terminals, identification information of which has already been stored.

3. The wireless communication apparatus according to claim 1, wherein said wireless communication apparatus sends information associated with wireless communication terminals, identification information of which has already been stored, to the wireless communication terminal, the information of which is newly stored.

4. The wireless communication apparatus according to claim 1, wherein said display device displays information of only a wireless communication terminal, identification information of which is not stored, of the wireless communication terminals, which output responses to the Inquiry message.

5. The wireless communication apparatus according to claim 1, wherein when said wireless communication apparatus sends data to a wireless communication terminal, identification information of which is stored, during operation other than the registration mode, said wireless communication apparatus starts a connection sequence.

* * * * *